United States Patent [19]

Brooker

[11] Patent Number: 4,514,462

[45] Date of Patent: Apr. 30, 1985

[54] WARP RESISTANT LAMINATES HAVING A CORE IMPREGNATED WITH A MIXTURE OF PHENOLIX RESIN AND ALKYL SUBSTITUTED PHENOL

[75] Inventor: Lenon G. Brooker, Hampton, S.C.

[73] Assignee: Westinghouse Electric Corp., Pittsburgh, Pa.

[21] Appl. No.: 485,089

[22] Filed: Apr. 14, 1983

[51] Int. Cl.³ .................. B32B 17/10; B32B 27/04
[52] U.S. Cl. ................................ 428/285; 428/286; 428/525; 428/526; 428/531; 524/594; 156/300; 156/335
[58] Field of Search ............... 428/525, 526, 530, 531, 428/285, 286

[56] References Cited

U.S. PATENT DOCUMENTS 3,373,070  3/1968  Fuerst .................................. 428/530
4,061,823  12/1977  McCaskey, Jr. et al. .......... 428/530

FOREIGN PATENT DOCUMENTS 2036044A  6/1980  United Kingdom ................ 428/530
2075517A  11/1981  United Kingdom ................ 428/530

Primary Examiner—Patricia C. Ives
Attorney, Agent, or Firm—D. P. Cillo

[57] ABSTRACT

An impregnating composition for warp free laminates, is made from the diluted reaction mixture of: a phenolic component selected from at least one of phenol, resol, xylenol, resorcinol, naphthol; alkyl substituted phenol, where alkyl contains from 4 to 13 carbon atoms; and aldehyde.

9 Claims, 1 Drawing Figure

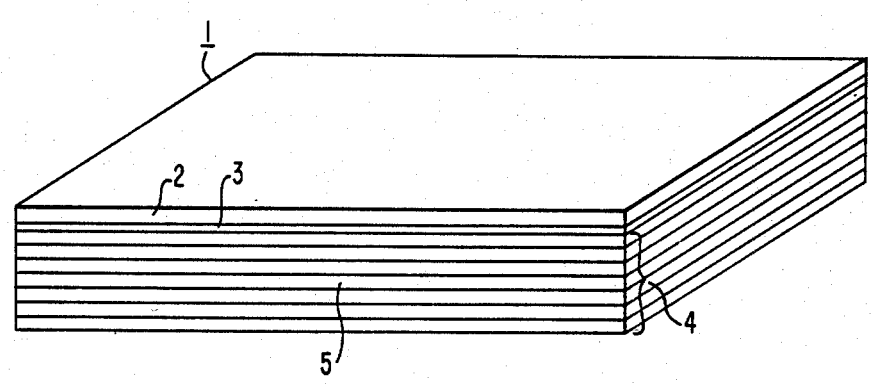

WARP RESISTANT LAMINATES HAVING A CORE IMPREGNATED WITH A MIXTURE OF PHENOLIX RESIN AND ALKYL SUBSTITUTED PHENOL

BACKGROUND OF THE INVENTION

Phenolic type resins are commonly used to impregnate Kraft paper core sheets used in the manufacture of decorative laminates, as taught by Meier, in U.S. Pat. No. 3,897,589, where the core is bonded to a decorative sheet of high quality alpha cellulose paper impregnated with a melamine resin. Meier taught the use of a variety of phenol component materials for Kraft paper impregnation, including phenol itself, cresol (methyl phenol), xylenol (dimethyl phenol), resorcinol (benzene diol), and naphthol (hydroxy napthalene).

O'Donnell, in U.S. Pat. No. 3,216,884, teaches the use of other phenolic type resins, as co-impregnants with polyester resins for cellulosic core sheets of printed circuit boards which are required to have good moisture resistance, good punching ability, and good electrical properties. The impregnating emulsion comprises droplets of phenolic resin dissolved in a diluent and suspended in a polyester resin. O'Donnell teaches a wide variety of phenol component materials including phenol itself or substituted phenols where hydrogen is substituted for by: F, Cl or Br; alkyl groups having from 1 to 18 carbons; alicyclic groups having from 5 to 18 carbons; aromatic or aralkyl groups having from 6 to 18 carbons; alkyl, alicyclic, aryl and aralkyl ketones; and the like.

Despite the widespread use of phenolic and melamine resins in the preparation of decorative sheets, thin laminates of large areas prepared from such resin combinations have a tendency to warp when subjected to substantial variations in humidity and temperature conditions. Warpage in decorative laminates can adversely affect the trimming, fabrication and eventual stability of the article prepared from the laminates, such as a wall panel or counter top. A number of theories exist which attempt to explain the cause of warpage in decorative laminates, among which are: the difference in cure rate of phenolic and melamine resin impregnated sheets; the difference in moisture absorption of melamine and phenolic resin in the cured state; and the differential rate of expansion of the various Kraft and alpha cellulose sheets which constitute the decorative laminate.

Another problem encountered in the manufacture of decorative laminates is the occurrence of dry spots, i.e., non-uniformity in appearance and composition of the core portion of the laminate. This non-uniformity in appearance and composition can normally be attributed to a lack of adequate penetration of the phenolic resin during the impregnation process, or inadequate resin flow in the "B"-staged impregnated sheet. Laminates prepared from non-uniform sheets normally have poor bond strength and are deficient in other mechanical and physical properties. This problem has become more acute recently because there is a trend toward using higher basis weight Kraft paper core sheets and higher solids resins in the decorative laminating industry. There has been a longfelt need then, for a new, more easily saturable core paper having a rate of expansion closer to alpha cellulose paper, or either a new phenolic or melamine resin system which would have good flow and penetration characteristics and better compatibility with the other resin used in the laminate.

SUMMARY OF THE INVENTION

The above need has been met and the above problems solved, by using a combination of phenolic component, aldehyde, and selected long chain alkyl substituted phenol, as the impregnating system for decorative laminate core sheets. More specifically, the impregnating resin system of this invention consists essentially of the above mixture in a mole ratio of phenolic component: long chain alkyl substituted phenol of from about 1:0.0035 to 0.5, where the alkyl group contains from 4 to 13 carbon atoms. The term "phenolic component", as used throughout, means either standard phenol, cresol, xylenol, resorcinol, or naphthol, or combinations thereof. No polyester is used or desired.

The inclusion of the long chain alkyl substituted phenol described hereinabove, preferably nonyl phenol, into the core impregnating resin system, substantially reduces warpage in cured laminates. The resins of this invention exhibit improved penetration characteristics over conventional phenolic resins at the same viscosity and solids levels. The resins of this invention also exhibit superior flow characteristics in the "B"-stage and exhibit less loss of flowability after long storage periods. As a result of the improved penetration and flow characteristics of the resins of this invention, laminates prepared from core stock impregnated with said resins exhibit uniformity in appearance and composition on the exterior surfaces.

BRIEF DESCRIPTION OF THE DRAWINGS

For a better understanding of the invention reference may be made to the preferred embodiment, exemplary of the invention, shown in the accompanying drawing, which is a pictorial view of a decorative laminate using the resin of this invention in the core sheets.

DESCRIPTION OF THE PREFERRED EMBODIMENTS

Referring now to the drawing, a decorative laminate assembly 1 is composed of an optional melamine resin impregnated overlay sheet 2, covering a melamine resin impregnated print sheet 3, and a core 4 of several porous sheets, typically four to seven, of a paper 5, impregnated with the resin of this invention.

The print sheet 3 may comprise a fibrous sheet of high quality alpha-cellulose paper, thin cotton fabric, silk, and the like, with a decorative design imprinted thereon, or the sheet may be pigmented throughout. Pigmented sheets with designs imprinted thereon may also be employed. Ordinarily, a clear, resin impregnated protective overlay sheet 2 is employed over the print sheet, to provide better abrasion resistance and a good surface appearance. Pigmented print sheets that have no design imprinted thereon need not require an overlay sheet. Suitable materials for overlay sheets include high quality alpha-cellulose paper, rayon and glass fabric. The sheets used in the core 4 are usually Kraft paper, but cotton cloth, cotton linter paper, glass cloth, and the like, and mixtures of these sheets can also be used.

High pressure laminating techniques are usually employed in preparing the laminates from the above described assembly, i.e., temperatures ranging from about 100° C. to about 200° C. and pressures ranging from about 500 psi. to about 2,000 psi. The time required to effect a cure of the resinous components of the assembly will usually be from about 15 minutes to about 60 minutes, depending on the pressures and temperatures used. The press and resulting heat and pressure consolidated laminate are allowed to cool from about 40° C. to 85° C. before the press is released and the laminates removed.

The decorative print sheet and the protective overlay sheet, if employed, are impregnated with at least 50% of their weight of a clear, thermosetting melamine resin. The term "melamine resin" is intended to apply to compositions which comprise essentially melamine and aldehyde reactants as the main ingredients, but which may also include plasticizers such as glycols, sulfonamides, alphatic diglycidyl ethers and the like, or other ingredients to provide postformability, craze resistance and the like. The manufacture of the melamine resins suitable for the practice of the present invention is well known in the art and need not be detailed herein.

Aldehydes useful in the melamine resin, and also in the phenolic based resin of this invention, include aqueous formaldehyde or uninhibited formaldehyde, acetaldehyde, paraformaldehyde, propionaldehyde, furfuraldehyde, benzaldehyde, glyoxal, methyl-glyoxal, etc. Mixtures of aldehydes may also be used. The preferred aldehyde is aqueous formaldehyde or uninhibited formaldehyde (less than 1% methanol) as they are inexpensive and work well. The formaldehyde is preferably used in the form of formalin, which is about a 37% by weight solution. The useful mole ratio of (phenolic component+alkyl substituted phenol):(aldehyde) in the resin of this invention is from about (1):(1 to 3).

The core sheets are impregnated with an impregnating resin reaction mixture of phenolic component, aldehyde, and long chain alkyl substituted phenol. The above mixture contains a mole ratio of (phenolic component):(long chain alkyl substituted phenol) of from about (1):(0.0035 to 0.5), preferably from about (1):(0.0035 to 0.35) where the alkyl group contains from 4 to 13 carbon atoms. Use of a ratio of (1):(over about 0.5) will start to produce laminate bonding problems.

The chemical formula of the long chain alkyl substituted phenol used as a modifying agent for the impregnating resin is shown below:

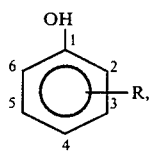

where R is an alkyl group containing from 4 to 13 carbon atoms. The preferred range of R is from 7 to 11 carbon atoms and the most preferred modifying agent is when R is 9 carbons, i.e., nonyl phenol. The most preferred position of R is in the number 4 or para position.

The phenolic component, aldehyde, and alkyl substituted phenol, are usually mixed together as separate components and reacted by heating to reflux for about 30 to 45 minutes. These steps are followed by dehydrating the reaction mixture, cooling, and adding a diluent, such as methanol. Usual viscosities of the diluted reaction mixture are from 20 cps. to 400 cps., at from 40% to 70% solids. The diluted reaction mixture is then impregnated into porous core sheets and dried to the "B"-stage, i.e., dry to the touch, not tacky, yet capable of complete cure by heating to the "C"-stage. The "B"-stage sheets are then stored until required.

It is not entirely clear at this time exactly what the alkyl substituted phenol modifying agent does. It is thought, however, that the alkyl chain prevents tight three dimensional crosslinking, making the cured admixture much more pliable. Use of alkyl of 3 or less, has little or no effect on increasing pliability. Use of alkyl of 14 or more presents incompatibility problems. As described hereinabove, the phenolic component-aldehyde combination can be selected from phenol-aldehyde, cresol-aldehyde, xylenol-aldehyde, resorcinol-aldehyde, naphthol-aldehyde, and their mixtures, but is preferably a phenol-aldehyde resin, i.e., hydroxy benzene-aldehyde. As in the case of the melamine resins, the impregnating resin of this invention can contain various plasticizers in amounts effective to provide postforming properties.

The following examples further illustrate this invention.

EXAMPLE 1

A reaction vessel fitted with stirrer, condenser, thermometer, and entry port, was charged with 37.87 lbs. of phenol (182.9 moles), 49.0 lbs. of 37% uninhibited aqueous formaldehyde (274.4 moles), 0.4 lb. of sodium carbonate slurried in 0.4 lb. of water, and 3.78 lbs. of nonyl phenol (7.8 moles). The mixture was heated to reflux. Reflux was continued for a period of 50 minutes. The reaction was then vacuum dehydrated until 20 lbs. of water was removed. Then 7.5 lbs. of methanol was added. The resulting resin was cooled to ambient temperature. The physical properties of the resin at 25° C. were measured and are as follows: Specific gravity, 1.147; viscosity, 127 cps; pH, 8.2; water dilutability, 60%. The resin had a set time of 25.5 minutes and a solids content of 60.0%. The mole ratio of phenol:nonyl phenol was 1:0.043. The mole ratio of phenol+nonyl phenol:formaldehyde was 1:1.44. This provided an example of the resin of this invention—Sample A resin.

Saturating Kraft paper of 121 lb. basis weight was impregnated with the above Sample A nonyl phenol modified phenolic resin. Sheets of the impregnated Kraft paper were dried to the "B"-stage, i.e., dry to the touch, non-tacky, yet capable of being heated to complete cure. The resulting "B"-staged Kraft sheets had the following properties:resin ratio=1.42 to 1.45; greeness (flow)=0.3% to 0.9%; volatile content=5.1% to 6.2%. The resin penetration was excellent and there was little loss of flow properties during storage.

A 12"×18"×1/32" laminate was prepared from 3 core sheets of the Sample A nonyl phenol modified phenolic resin impregnated Kraft paper described above, and one sheet each of conventional melamine impregnated print and overlay. This was the Sample A laminate—a laminate made in accordance with the invention. A similar laminate—Sample B laminate—was made as described above, except that the mole ratio of phenol:nonyl phenol was 1:0.25. The mole ratio of phenol+nonyl phenol:formaldehyde was 1:1.44. The viscosity and solids were approximately the same as the Sample A resin. This was also an example of the resin of this invention.

A control laminate—Sample C laminate—was made as described above, except a phenolic resin was used that did not contain any nonyl phenol—Sample C resin. The viscosity and solids were approximately the same as the Sample A resin of this invention—described above. The mole ratio of phenol:formaldehyde was about 1:1.5. A comparative laminate—Sample D laminate—was also made as described above and contained nonyl phenol, except that the mole ratio of phenol:nonyl phenol was 1:0.75. The mole ratio of phenol+nonyl phenol:formaldehyde was 1:1.44—Sample D resin. The viscosity and solids were approximately the same as the Sample A resin of this invention.

The stack-up of core, print and overlay sheets was molded in conventional pack form in a lab press at about 1,000 psi. for about 20 minutes, to provide unitary, consolidated, cured, 1/32" thick laminates. After cooling and removal from the press, the laminates were trimmed to 12"×18" size, sanded, and observed for warpage, and uniformity of appearance over a period of time, at 20% Relative Humidity and 78° F. Sample A and B laminates, the laminates of this invention, containing a 1:0.043 and a 1:0.25 phenol:nonyl phenol mole ratio, respectively, were flat, with no warpage, and were uniform in appearance with no dry spots. The Sample C laminates, without nonyl phenol, were warped a substantial amount toward the back surface and had dry spots resulting in a non-uniform appearance. The Sample D laminates, having an excess of nonyl phenol, were not bonded sufficiently to meet NEMA requirements for a decorative high pressure laminate. Even when the molding cycle was extended to 60 minutes, the bonding was still insufficient to meet NEMA requirements, which indicated that the Sample D high level of nonyl phenol was not practical in the manufacture of decorative high pressure laminates. A mole ratio of phenol:nonyl phenol of about 1:0.5 would allow good bonding and also eliminate warpage and dry spots. A summary of these results is provided below:

| Sample | Mole Ratio phenol:nonyl phenol | Laminate Warpage | Laminate Dry Spots |
|--------|-------------------------------|------------------|---------------------|
| A      | 1:0.043                       | no               | no                  |
| B      | 1:0.25                        | no               | no                  |
| *C     | 1:0.000                       | yes              | yes                 |
| **D    | 1:0.75                        | laminate did not bond |                |

*Control Samples;
**Comparative Samples

EXAMPLE 2

Full size, 48"×96"×1/32", laminates were made from four core sheets and one sheet each of melamine impregnated print and overlay, using the laminating techniques of EXAMPLE 1. Sample A' laminates used the same Sample A nonyl phenyl modified phenolic resin that was described in EXAMPLE 1, i.e., a mole ratio of phenol:nonyl phenol of 1:0.043, except that a minor amount of ammonium sulfamate plasticizer was added to provide post forming properties. Sample C' laminates contained the Sample C resin with no nonyl phenyl, as described in EXAMPLE 1, and also contained the same amount of ammonium sulfamate as in Sample A'. Both resins had approximately the same viscosity and solids content.

After cooling and removal from the press, the laminates were trimmed, sanded and observed for warpage and uniformity of appearance over a period of time. Sample A' laminates, the laminates of this invention, containing a 1:0.043 phenol:nonyl phenol mole ratio, were virtually flat and in no case exceeded a 1" warpage toward the back surface on the 48"×96"×1/32" sheet after 5 days of observation. The Sample C' laminates, without nonyl phenol, warped 6" to 8" toward the back surface on the 48"×96"×1/32" sheet after 5 days of observation. The Sample A' laminate was also superior to the Sample C' control laminate in uniformity of appearance, and was comparable to it on NEMA boiling and the like tests, as shown below:

| National Electrical Mfgr. Assoc. (NEMA) Properties | Sample A' | *Sample C' |
|----|----|----|
| Radient Heat Resistance (LD3-3.07) | 140 sec | 136 sec |
| Impact Resistance (LD3-3.03) | 44 inches | 43 inches |
| Blister Resistance (LD3-3.15) | 400° F.+ | 400° F.+ |
| Dimensional Stability (LD3-3.04) | | |
| With Grain | 0.187% | 0.204% |
| Cross Grain | 0.527% | 0.549% |
| Boiling Water Resistance (LD3-3.05) | No Effect | No Effect |
| High Temp. Resistance (LD3-3.06) | No Effect | No Effect |

*Control Sample

As can be seen from the EXAMPLES, nonyl phenol substitution within a selected range, provided dramatic and unexpected warpage improvement, especially in commercial size sheets, and superior dry spot control indicating better penetration and wetting. Other alkyl substituted phenols within the carbon chain and mole ratio ranges set forth hereinabove, would provide equally outstanding results and could be used with the other types of phenolic resins described hereinabove.

We claim:

1. A sheet material, impregnated with a reaction mixture composition consisting essentially of:
   (1) a phenolic component selected from the group consisting of phenol, cresol, xylenol, resorcinol, naphthol, and mixtures thereof,
   (2) alkyl substituted phenol, where alkyl contains from 4 to 13 carbon atoms, and
   (3) aldehyde; where the mole ratio of phenolic component:alkyl substituted phenol is from about 1:0.0035 to 0.5, said composition being in the dried "B"-stage.

2. The impregnated sheet of claim 1, where the sheet material is selected from the group consisting of Kraft paper, cotton cloth, cotton linter paper, and glass cloth.

3. The impregnated sheet of claim 1, where the phenolic component is phenol, the alkyl substituted phenol is nonyl phenol, the alkyl of the alkyl substituted phenol is in the para position, the alkyl substituted phenol is single alkyl substituted phenol, and the aldehyde is selected from the group consisting of formaldehyde and uninhibited formaldehyde.

4. The impregnated sheet of claim 1, where the mole ratio of phenolic component+alkyl substituted phenol:aldehyde is from about 1:1 to 3.

5. A cured, bonded, unitary, warp resistant comprising:
   (1) a melamine resin impregnated sheet, and
   (2) at least one core sheet disposed next to the melamine impregnated sheet, said core sheet impregnated with a reaction mixture composition consisting essentially of:
   (1) a phenolic component selected from the group consisting of phenol, cresol, xylenol, resorcinol, naphthol, and mixtures thereof,
   (2) alkyl substituted phenol, where alkyl contains from 4 to 13 carbon atoms, and
   (3) aldehyde; where the mole ratio of phenolic component:alkyl substituted phenol is from about 1:0.0035 to 0.5,
said melamine resin and reaction mixture composition being in the cured state.

6. The laminate of claim 5, where the core sheet is selected from the group consisting of Kraft paper, cotton cloth, cotton linter paper, and glass cloth, the sheet impregnated with melamine resin is alpha-cellulose paper, the alkyl of the alkyl substituted phenol is in the para position, and the alkyl substituted phenol is single alkyl substituted phenol.

7. The laminate of claim 5, where the mole ratio of phenolic component+alkyl substituted phenol:aldehyde in the resin of this invention is from about 1:1 to 3.

8. The laminate of claim 5, containing a melamine resin impregnated decorative print sheet, and where, in the alkyl substituted phenol, alkyl contains from 7 to 11 carbons.

9. The laminate of claim 8, containing a melamine resin impregnated protective overlay sheet covering the print sheet, and where the phenolic component is phenol, the alkyl substituted phenol is nonyl phenol, and the aldehyde is selected from the group consisting of formaldehyde and uninhibited formaldehyde.

* * * * *